(12) United States Patent
Noguchi

(10) Patent No.: US 10,504,296 B2
(45) Date of Patent: Dec. 10, 2019

(54) INFORMATION PROCESSING METHOD AND SYSTEM FOR EXECUTING THE INFORMATION PROCESSING METHOD

(71) Applicant: COLOPL, Inc., Tokyo (JP)

(72) Inventor: Yasuhiro Noguchi, Tokyo (JP)

(73) Assignee: COLOPL, INC., Tokyo (JP)

( * ) Notice: Subject to any disclaimer, the term of this patent is extended or adjusted under 35 U.S.C. 154(b) by 27 days.

(21) Appl. No.: 15/827,680

(22) Filed: Nov. 30, 2017

(65) Prior Publication Data

US 2018/0151001 A1 May 31, 2018

(30) Foreign Application Priority Data

Nov. 30, 2016 (JP) .................................. 2016-232434

(51) Int. Cl.
*G06T 19/20* (2011.01)
*G06F 3/12* (2006.01)
(Continued)

(52) U.S. Cl.
CPC ............ *G06T 19/20* (2013.01); *A63F 13/211* (2014.09); *A63F 13/212* (2014.09); *A63F 13/25* (2014.09);
(Continued)

(58) Field of Classification Search
None
See application file for complete search history.

(56) References Cited

U.S. PATENT DOCUMENTS 6,843,726 B1 * 1/2005 Nomi ...................... A63F 13/06
273/148 R
2004/0209684 A1 * 10/2004 Hisano .................... A63F 13/10
463/32
(Continued)

FOREIGN PATENT DOCUMENTS

JP 2002-51399 A 2/2002
JP 2010-246851 A 11/2010
(Continued)

OTHER PUBLICATIONS

Office Action in JP Application No. 2016-232434, dated Jul. 4, 2017, 5pp.
(Continued)

*Primary Examiner* — Saptarshi Mazumder
(74) *Attorney, Agent, or Firm* — Hauptman Ham, LLP

(57) ABSTRACT

A method includes generating virtual space data defining a virtual space including a self-avatar, a first object capable of exerting a predetermined effect on the self-avatar, and a second object. The method includes identifying a visual field based on a detected movement of a head-mounted display. The method includes generating a visual-field image for display on the head-mount display. The method includes identifying a relative positional relationship between the first object and the self-avatar in response to a determination that the self-avatar is likely to receive the predetermined effect from the first object. The method includes setting a position of the second object based on the identified relative positional relationship. The method includes outputting predetermined sound data based on the set position of the second object. The method includes outputting a sound corresponding to the predetermined sound data from a sound outputting unit.

20 Claims, 12 Drawing Sheets

(51) Int. Cl.
- *G02B 27/01* (2006.01)
- *G06F 3/01* (2006.01)
- *G06T 19/00* (2011.01)
- *G06F 1/16* (2006.01)
- *A63F 13/25* (2014.01)
- *A63F 13/211* (2014.01)
- *A63F 13/5255* (2014.01)
- *A63F 13/54* (2014.01)
- *A63F 13/212* (2014.01)
- *H04S 7/00* (2006.01)

(52) U.S. Cl.
CPC .......... *A63F 13/5255* (2014.09); *A63F 13/54* (2014.09); *G02B 27/017* (2013.01); *G06F 1/163* (2013.01); *G06F 3/011* (2013.01); *G06F 3/012* (2013.01); *G06T 19/003* (2013.01); *H04S 7/303* (2013.01); *G06T 2219/2004* (2013.01); *H04S 2400/11* (2013.01)

(56) References Cited

U.S. PATENT DOCUMENTS

| | | | |
|---|---|---|---|
| 2015/0072785 A1* | 3/2015 | Itsuno | A63F 13/67 463/31 |
| 2017/0144042 A1* | 5/2017 | Kanda | A63B 69/00 |

FOREIGN PATENT DOCUMENTS

| | | |
|---|---|---|
| JP | 2013-5021 A | 1/2013 |
| JP | 2013-162285 A | 8/2013 |
| JP | 2014-90251 A | 5/2014 |

OTHER PUBLICATIONS

Notice of Allowance in JP Application No. 2016-232434, dated Sep. 5, 2017, 6pp.

* cited by examiner

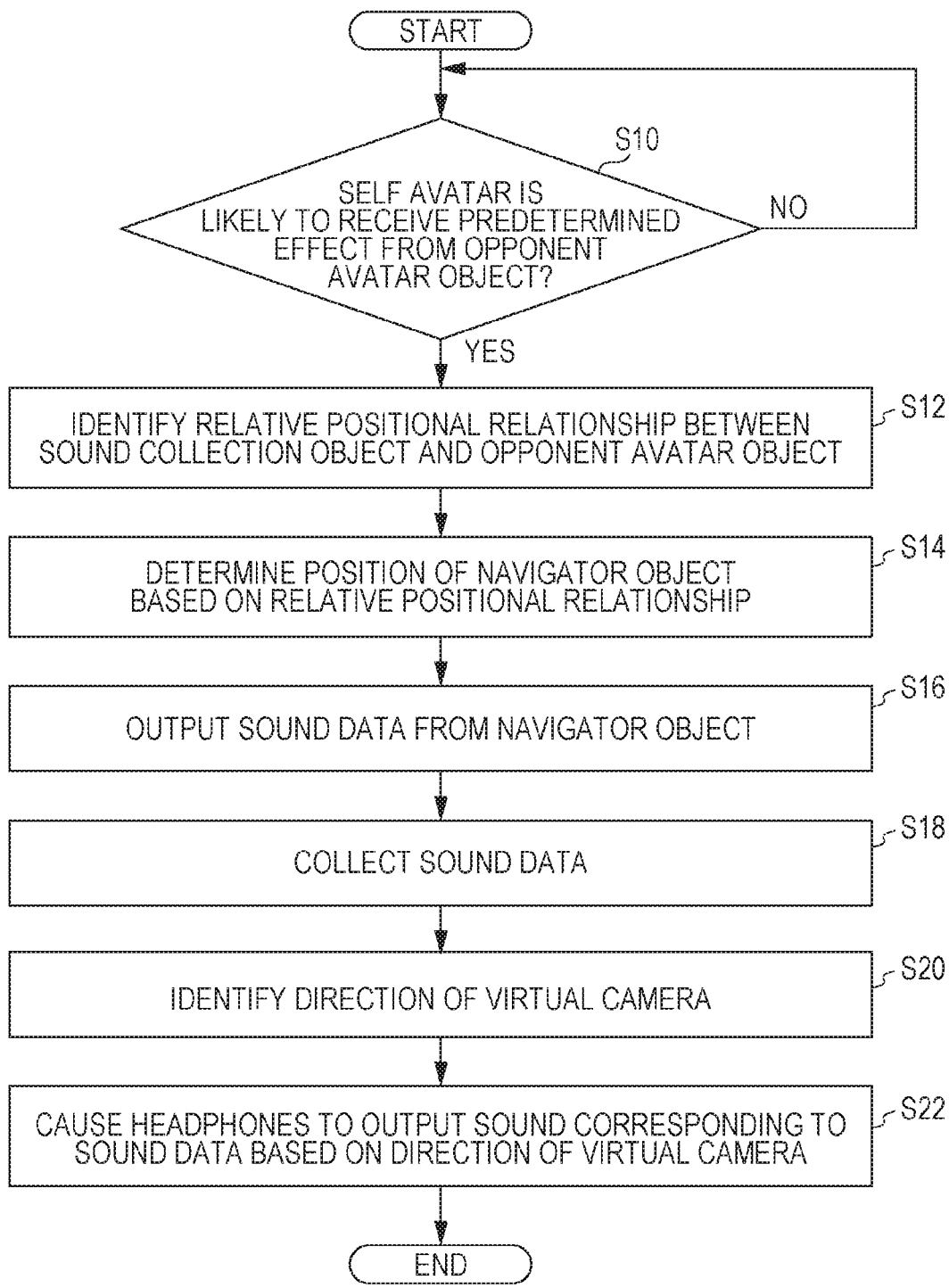

INFORMATION PROCESSING METHOD AND SYSTEM FOR EXECUTING THE INFORMATION PROCESSING METHOD

RELATED APPLICATIONS

The present application claims priority to Japanese Application Number 2016-232434, filed Nov. 30, 2016, the disclosure of which is hereby incorporated by reference herein in its entirety.

BACKGROUND

This disclosure relates to an information processing method and a system for executing the information processing method.

In Japanese Patent Application Laid-open No. 2010-246851, there is described a method involving, in a first-person shooter (FPS) game, when a player character receives an attack from an opponent character, displaying around the player character a damage mark indicating a direction from which the attack is received.

In recent years, there has been known a game (hereinafter sometimes referred to as "VR game") that allows a user to be immersed in a virtual reality (VR) space by wearing a head-mounted display (HMD). However, when the method disclosed in Japanese Patent Application Laid-open No. 2010-246851 is applied to a VR game, the user's experience of being immersed in the VR space may be reduced because a manner in which the damage mark is displayed is unrealistic.

SUMMARY

An object of at least one embodiment of this disclosure to provide an information processing method capable of allowing a user to easily recognize that the user is likely to receive a certain effect from around the user without reducing a user's sense of immersion. An object of at least one embodiment of this disclosure to provide a system for executing the information processing method.

According to at least one embodiment of this disclosure, there is provided an information processing method, which is executed in a system including a head-mounted display and a sound outputting unit. The information processing method includes generating virtual space data for defining a virtual space including a self avatar, a virtual camera, a first object, a second object, and a sound collection object. The information processing method further includes causing the head-mounted display to display a visual-field image based on a visual field of the virtual camera and the virtual space data. The information processing method further includes determining whether or not the self avatar is likely to receive a predetermined effect from the first object. The information processing method further includes identifying a relative positional relationship between the first object and the sound collection object in response to a determination that the self-avatar is likely to receive the predetermined effect. The information processing method further includes setting a position of the second object based on the identified relative positional relationship. The information processing method further includes causing the sound collection object to collect predetermined sound data output from the second object having the position set, and outputting a sound corresponding to the predetermined sound data from the sound outputting unit.

According to at least one embodiment of this disclosure, the information processing method allows the user to easily recognize that the user is likely to receive a certain effect from around the user without reducing the user's sense of immersion in the VR space.

BRIEF DESCRIPTION OF THE DRAWINGS

FIG. 7 is a flowchart of an information processing method according to at least one embodiment of this disclosure.

DETAILED DESCRIPTION

Figure 1:
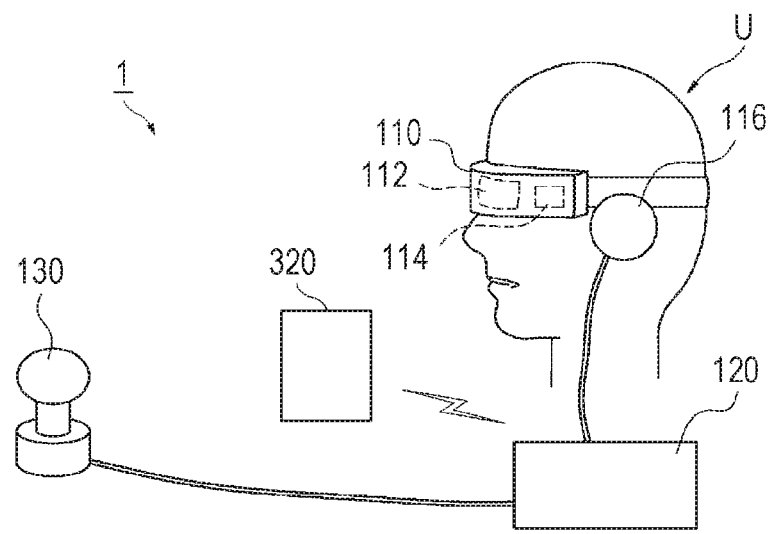
FIG. 1 is a schematic diagram of a head-mounted display (HMD) system according to at least one embodiment of this disclosure.

Now, a description is given of an outline of at least one embodiment of this disclosure.

(1) According to at least one embodiment of this disclosure, there is provided an information processing method, which is executed in a system including a head-mounted display and a sound outputting unit. The information processing method includes generating virtual space data for defining a virtual space including a self avatar, a virtual camera, a first object, a second object, and a sound collection object. The information processing method further includes causing the head-mounted display to display a visual-field image based on a visual field of the virtual camera and the virtual space data. The information processing method further includes determining whether or not the self avatar is likely to receive a predetermined effect from the first object. The information processing method further includes identifying a relative positional relationship between the first object and the sound collection object in response to a determination that the self-avatar is likely to receive the predetermined effect. The information processing method further includes setting a position of the second object based on the identified relative positional relationship. The information processing method further includes causing the sound collection object to collect predetermined sound data output from the second object having the position set, and outputting a sound corresponding to the predetermined sound data from the sound outputting unit.

According to the method described above, the user is able to easily recognize that the user is likely to receive a certain effect from around the user without reducing the user's sense of immersion.

(2) According to one or more embodiments, the setting of the position of the second object includes designating the position of the second object so that the first object and the second object are included in the same visual field.

According to the method described above, when the user directs his or her line of sight toward the second object, which is, for example, a navigator character (self-avatar), the first object, which is, for example, an enemy character, is included in the visual field. As a result, the user is able to easily visually recognize the first object based on the sound emitted from the second object.

(3) According to one or more embodiments, the setting of the position of the second object includes arranging the second object at a position at which the second object does not overlap with the first object in the visual field when the first object is included in the visual field.

According to the method described above, visibility of the first object is not impaired by the second object.

(4) According to one or more embodiments, the identifying of the relative positional relationship includes arranging the second object at a fixed distance from the sound collection object.

According to the method described above, the second object is arranged at a predetermined position on a surface of a sphere having the sound collection object as a center of the sphere. As a result, an amount of information to be processed during the generation of the sound data is reduced, and reproduction of 3D audio effects is adjusted, for example, sounds to be output from left and right earphones based on the positional relationship between the sound collection object and the second object.

(5) According to one or more embodiments, the sound collection object is integral with the virtual camera.

According to the method described above, a more realistic sound can be provided particularly in the case of a first-person viewpoint.

(6) According to one or more embodiments the virtual space further includes a third avatar object associated with a user of the head-mounted display; and the sound collection object is integral with the third avatar object.

According to the method described above, a sound more suited to the user's feeling is provided, thereby allowing the user to intuitively understand the situation.

(7) According to at least one embodiment of this disclosure, there is provided a system for executing the information processing method of any one of Items (1) to (6).

According to this configuration, a system allows the user to easily recognize that the user is likely to receive a certain effect from around the user without reducing the user's sense of immersion.

At least one embodiment of this disclosure is described below with reference to the drawings. Once a component is described in this description of the embodiment, a description on a component having the same reference number as that of the already described component is omitted for the sake of convenience.

FIG. 1 is a schematic diagram of a head-mounted display (hereinafter referred to simply as "HMD") system 1, which implements an information processing method according to at least one embodiment of this disclosure. In FIG. 1, the HMD system 1 includes an HMD 110 mounted to the head of a user U, a position sensor 130, a control device 120, and an external controller 320.

The HMD 110 includes a display unit 112, an HMD sensor 114, and headphones 116 (example of sound outputting unit).

The display unit 112 includes a non-transmissive display device configured to cover a field of view (visual field) of the user U wearing the HMD 110. In at least one embodiment, the HMD includes a see-through display device, and may be configured temporarily as a non-transmissive display device through adjustment of transmittance of the see-through display device. With this, the user U can see only a visual-field image displayed on the display unit 112, and hence the user U can be immersed in a virtual space. The display unit 112 may include a left-eye display unit configured to provide an image to a left eye of the user U, and a right-eye display unit configured to provide an image to a right eye of the user U.

The HMD sensor 114 is mounted near the display unit 112 of the HMD 110. The HMD sensor 114 includes at least one of a geomagnetic sensor, an acceleration sensor, or an inclination sensor (for example, an angular velocity sensor or a gyro sensor), and can detect various movements of the HMD 110 worn on the head of the user U.

The headphones 116 convey sounds to right and left ears of the user U. The headphones 116 are configured to receive sound data (electrical signal) from the control device 120 to output sounds based on the received sound data. The sound to be output to a right-ear speaker of the headphones 116 may be different from the sound to be output to a left-ear speaker of the headphones 116. For example, the control device 120 may be configured to obtain sound data to be input to the right-ear speaker and sound data to be input to the left-ear speaker based on a head-related transfer function, to thereby output those two different pieces of sound data to the left-ear speaker and the right-ear speaker of the headphones 116, respectively. Instead of providing the headphones 116 to the HMD 110, a speaker (e.g., two stationary speakers) or earphones independent of the HMD 110 may be provided.

The position sensor 130 is constructed of, for example, a position tracking camera, and is configured to detect the position of the HMD 110. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 may include an infrared sensor or a plurality of optical cameras.

The control device 120 is capable of acquiring information on the position of the HMD 110 based on the information acquired from the position sensor 130, and accurately associating the position of the virtual camera in the virtual space with the position of the user U wearing the HMD 110 in the real space based on the acquired information on the position of the HMD 110.

Figure 2:
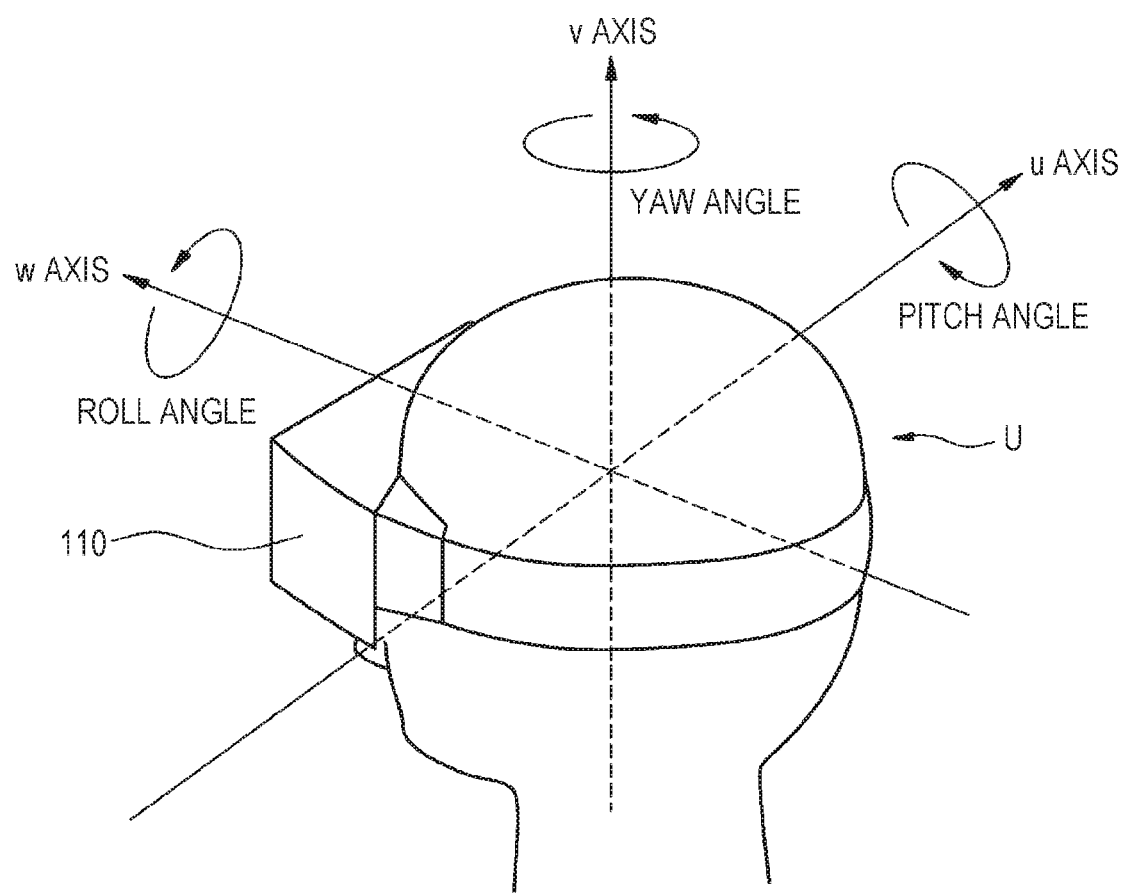
FIG. 2 is a diagram of a head of a user wearing an HMD according to at least one embodiment of this disclosure.

Next, with reference to FIG. 2, a method of acquiring information relating to a position and an inclination of the HMD 110 is described. FIG. 2 is a diagram of the head of the user U wearing the HMD 110 according to at least one embodiment of this disclosure. The information relating to the position and the inclination of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (uvw coordinates) are defined about the head of the user U wearing the HMD 110. A perpendicular direction in which the user U stands upright is defined as a v axis, a direction being orthogonal to the v axis and passing through the center of the display unit 112 and the user U is defined as a w axis, and a direction orthogonal to the v axis and the w axis is defined as a u axis. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 is configured to determine angular information for controlling a visual axis of the virtual camera, which defines visual-field information, based on the detected change in angles about the respective uvw axes.

Figure 3:
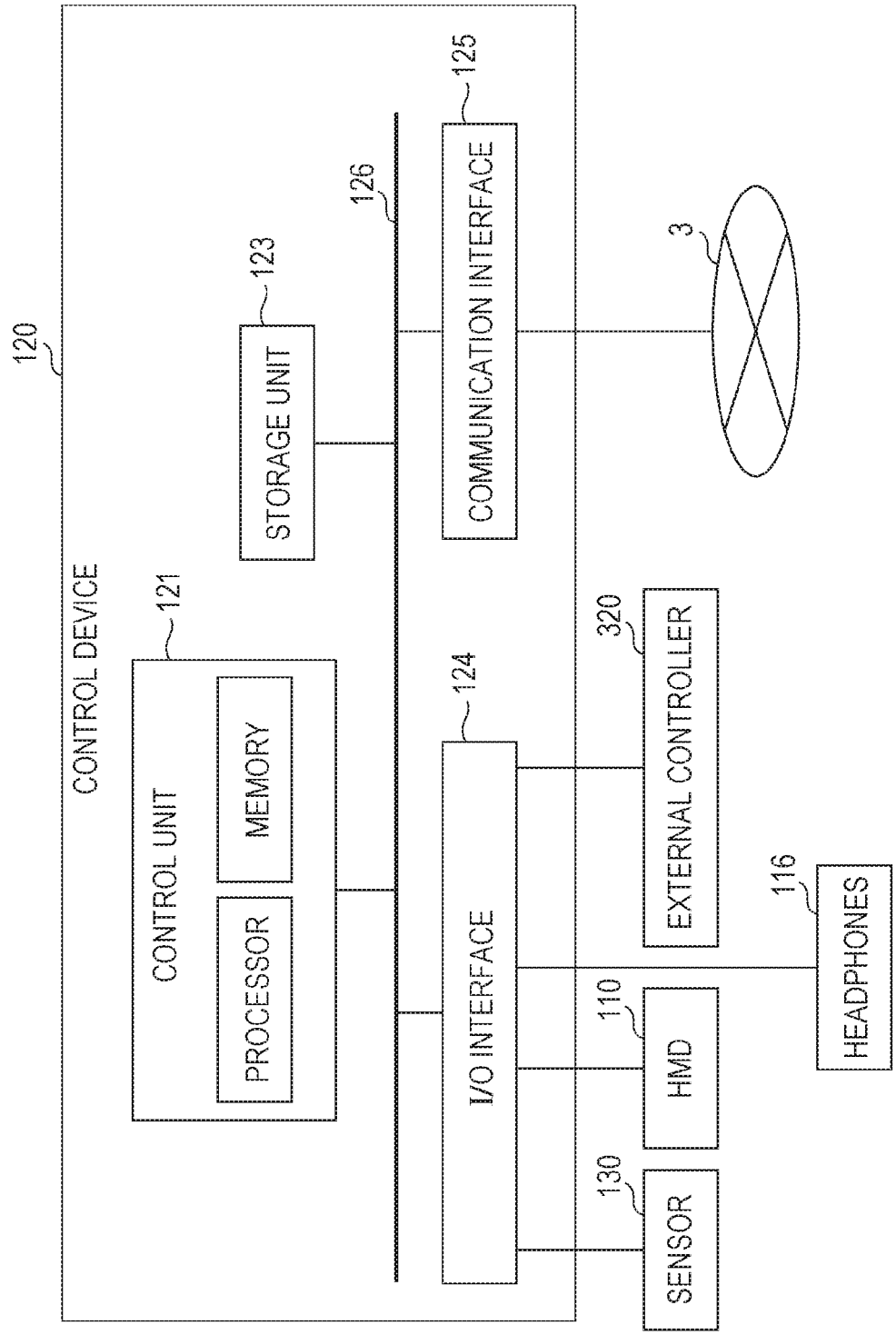
FIG. 3 is a diagram of a hardware configuration of a control device according to at least one embodiment of this disclosure.

Next, with reference to FIG. 3, a hardware configuration of the control device 120 is described. In FIG. 3, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separately from the HMD 110, or may be built into the HMD 110. Further, a part of the functions of the control device 120 may be executed by hardware mounted to the HMD 110, and other functions of the control device 120 may be executed by hardware mounted to another device separate from the HMD 110.

The control unit 121 includes a memory and a processor. The memory is constructed of, for example, a read only memory (ROM) having various programs and the like stored therein or a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to load, on the RAM, programs designated by various programs installed into the ROM to execute various types of processing in cooperation with the RAM.

In particular, the control unit 121 may control various operations of the control device 120 by causing the processor to load, on the RAM, an information processing program (to be described later) for causing a computer to execute the information processing method according to at least one embodiment and execute the program in cooperation with the RAM. The control unit 121 executes a predetermined application (game program) stored in the memory or the storage unit 123 to provide a virtual space (visual-field image) on the display unit 112 of the HMD 110. With this, the user U can be immersed in the virtual space provided on the display unit 112.

The storage unit (storage) 123 is a storage device, for example, a hard disk drive (HDD), a solid state drive (SSD), or a USB flash memory, and is configured to store programs and various types of data. The storage unit 123 may store the information processing program. Further, the storage unit 123 may store programs for authentication of the user and game programs including data relating to various images and objects. Further, a database including tables for managing various types of data may be constructed in the storage unit 123.

The I/O interface 124 is configured to connect each of the position sensor 130, the HMD 110, the headphones 116, and the external controller 320 to the control device 120 so as to enable communication therebetween, and is constructed of, for example, a universal serial bus (USB) terminal, a digital visual interface (DVI) terminal, or a high-definition multimedia interface (R) (HDMI) terminal. The control device 120 may be wirelessly connected to each of the position sensor 130, the HMD 110, the headphones 116, and the external controller 320.

The communication interface 125 is configured to connect the control device 120 to the communication network 3, for example, a local area network (LAN), a wide area network (WAN), or the Internet. The communication interface 125 includes various wire connection terminals and various processing circuits for wireless connection for communication to/from an external device via the communication network 3, and is configured to become compatible with communication standards for communication via the communication network 3.

Figure 4:
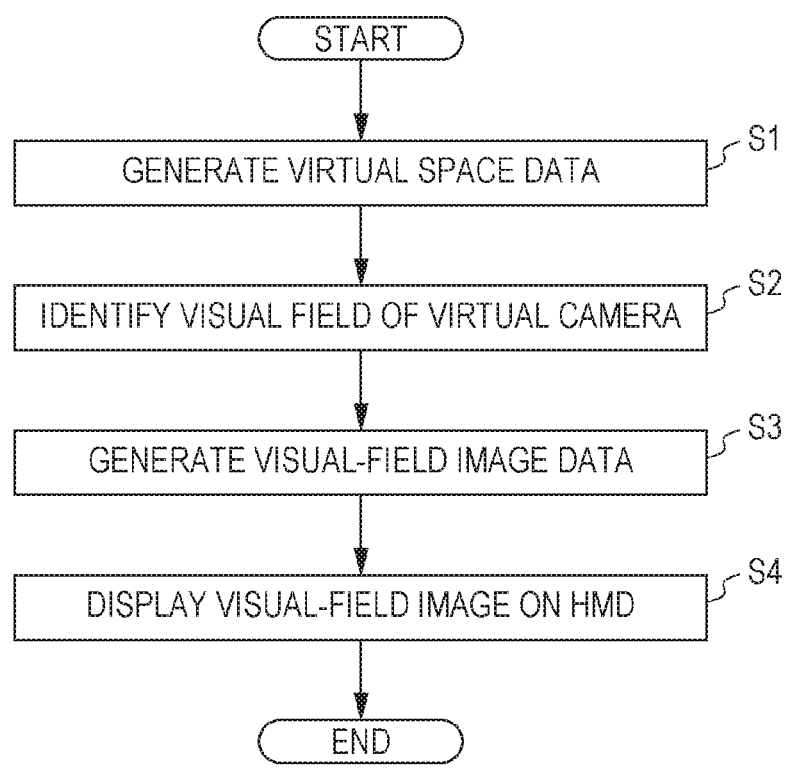
FIG. 4 is a flowchart of processing of displaying a visual-field image on the HMD according to at least one embodiment of this disclosure.
Figure 5:
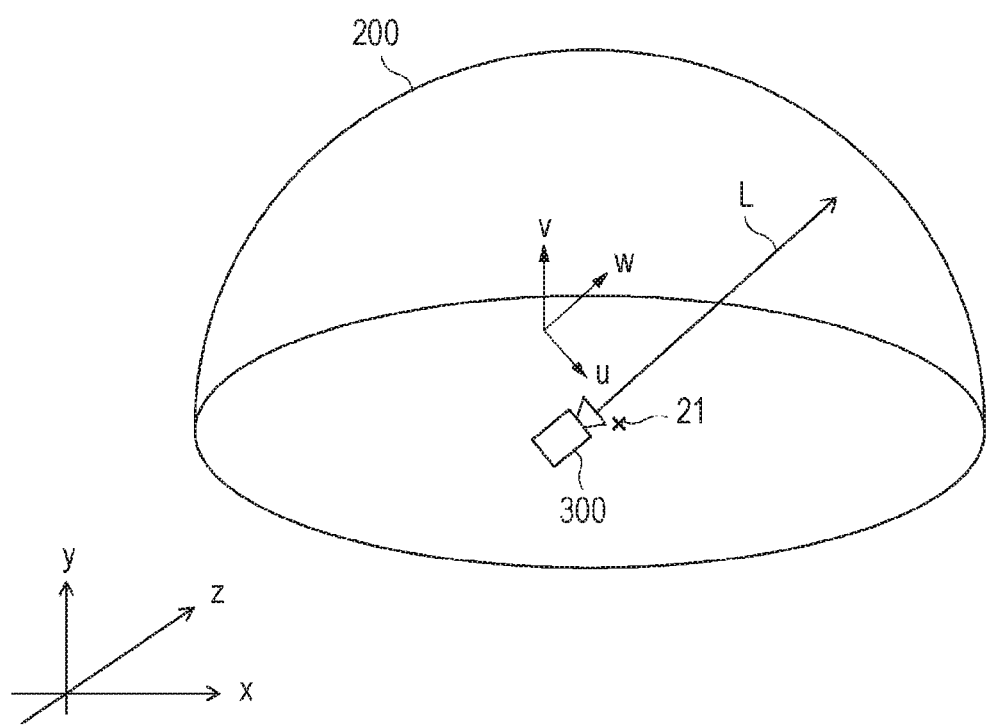
FIG. 5 is an xyz spatial diagram of a virtual space according to at least one embodiment of this disclosure.
Figure 6A:
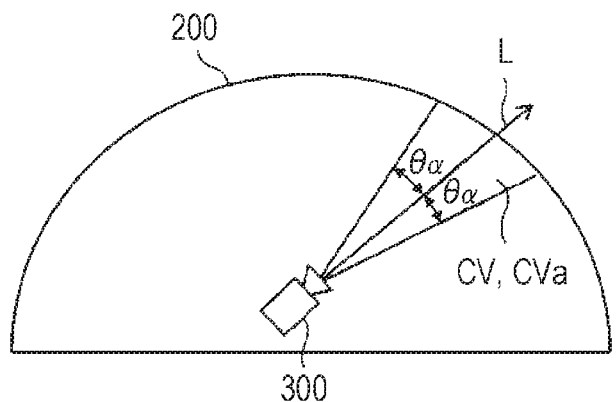
FIG. 6A is a yx plane diagram of the virtual space in FIG. 5 according to at least one embodiment of this disclosure.
Figure 6B:
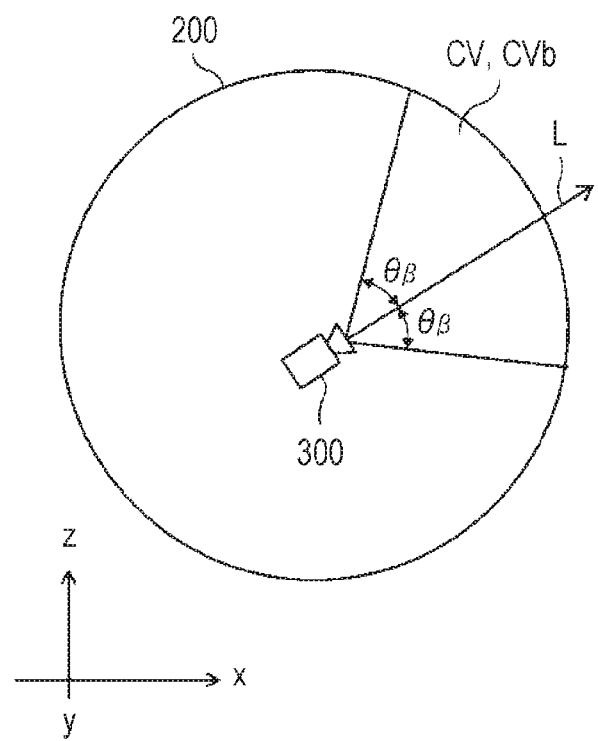
FIG. 6B is a zx plane diagram of the virtual space in FIG. 5 according to at least one embodiment of this disclosure.

Next, with reference to FIG. 4 to FIG. 6A and FIG. 6B, processing of displaying the visual-field image on the HMD 110 is described. FIG. 4 is a flowchart of processing of displaying the visual-field image on the HMD 110 according to at least one embodiment of this disclosure. FIG. 5 is an xyz spatial diagram of a virtual space 200 according to at least one embodiment of this disclosure. FIG. 6A is a yx plane diagram of the virtual space 200 in FIG. 5 according to at least one embodiment of this disclosure. FIG. 6B is a zx plane diagram of the virtual space 200 in FIG. 5 according to at least one embodiment of this disclosure.

In FIG. 4, in Step S1, the control unit 121 (refer to FIG. 3) generates virtual space data defining the virtual space 200 including a virtual camera 300. In FIG. 5, FIG. 6A, and FIG. 6B, the virtual space 200 is defined as an entire celestial sphere having a center position 21 as the center (in FIG. 5, FIG. 6A, and FIG. 6B, only the upper-half celestial sphere is included for clarity). Further, in the virtual space 200, an xyz coordinate system having the center position 21 as the origin is set. In an initial state of the HMD system 1, the virtual camera 300 is arranged at the center position 21 of the virtual space 200. The uvw coordinate system that defines the visual field of the virtual camera 300 is determined so as to synchronize with the uvw coordinate system that is defined about the head of the user U in the real space. Further, the virtual camera 300 may be moved in the virtual space 200 in synchronization with the movement in the real space of the user U wearing the HMD 110.

Next, in Step S2, the control unit 121 specifies a visual field CV (refer to FIG. 6A and FIG. 6B) of the virtual camera 300. Specifically, the control unit 121 acquires information relating to a position and an inclination of the HMD 110 based on data representing the state of the HMD 110, which is transmitted from the position sensor 130 and/or the HMD sensor 114. Next, the control unit 121 determines the position and the direction of the virtual camera 300 in the virtual space 200 based on the information relating to the position and the inclination of the HMD 110. Next, the control unit 121 determines a reference line of sight L, which is equivalent to the visual axis of the virtual camera 300, based on the position and the direction of the virtual camera 300, and specifies the visual field CV of the virtual camera 300 based on the determined reference line of sight L. In this case, the visual field CV of the virtual camera 300 is the same as a part of the region of the virtual space 200 that can be visually recognized by the user U wearing the HMD 110. In other words, the visual field CV is the same as a part of the region of the virtual space 200 to be displayed on the HMD 110). Further, the visual field CV has a first region CVa set as an angular range of a polar angle θα about the reference line of sight L in the xy plane in FIG. 6A, and a second region CVb set as an angular range of an azimuth θβ about the reference line of sight L in the xz plane in FIG. 6B.

As described above, the control unit 121 can specify the visual field CV of the virtual camera 300 based on the data transmitted from the position sensor 130 and/or the HMD sensor 114. In this case, when the user U wearing the HMD 110 moves, the control unit 121 can specify the visual field CV of the virtual camera 300 based on the data representing the movement of the HMD 110, which is transmitted from the position sensor 130 and/or the HMD sensor 114. That is, the control unit 121 can move the visual field CV in accordance with the movement of the HMD 110.

Next, in Step S3, the control unit 121 generates visual-field image data representing the visual-field image to be displayed on the display unit 112 of the HMD 110. Specifically, the control unit 121 generates the visual-field image data based on the virtual space data for defining the virtual space 200 and the visual field CV of the virtual camera 300. That is, a range of the virtual space data that is rendered as the visual-field image data is determined based on the visual field CV of the virtual camera 300.

Next, in Step S4, the control unit 121 displays the visual-field image on the display unit 112 of the HMD 110 based on the visual-field image data. As described above, the visual field CV of the virtual camera 300 changes in accordance with the movement of the user U wearing the HMD 110, and thus the visual-field image to be displayed on the HMD 110 changes as well. Thus, the user U can be immersed in the virtual space 200.

Figure 8:
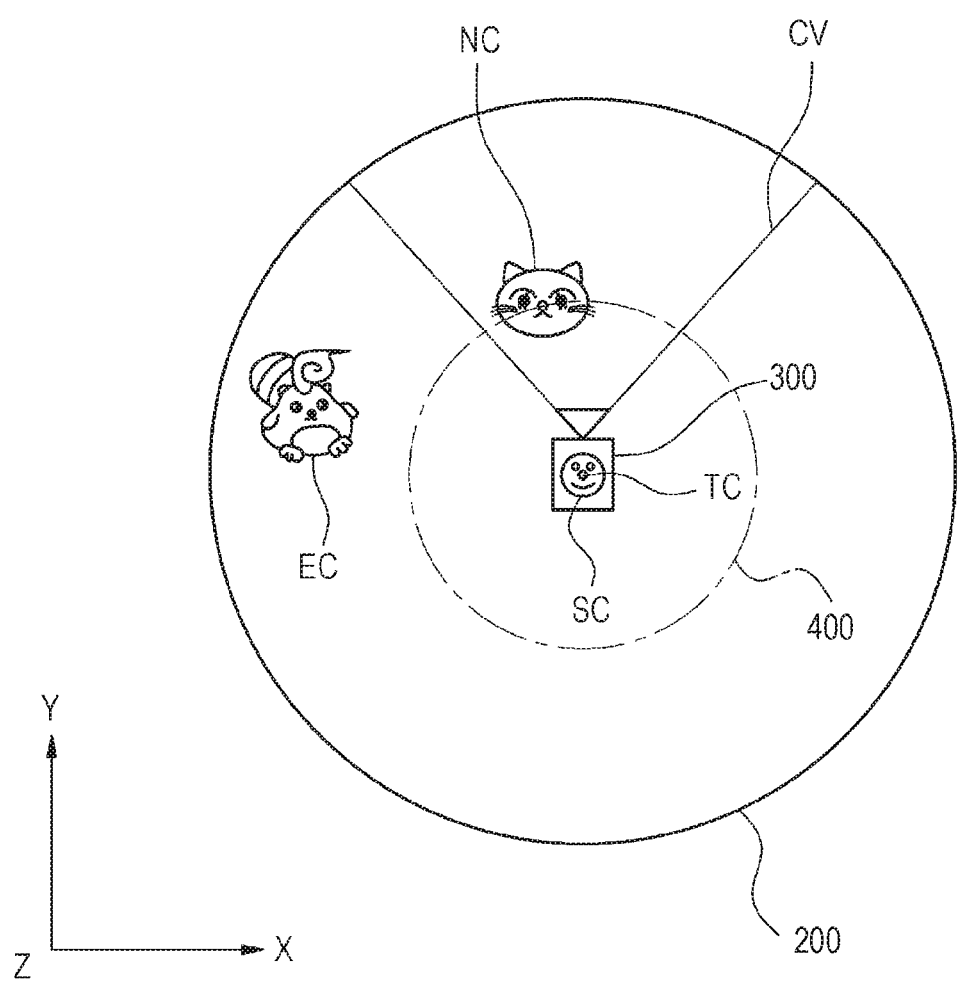
FIG. 8 is a schematic diagram of a VR space during execution of the information processing method according to at least one embodiment of this disclosure.
Figure 9:
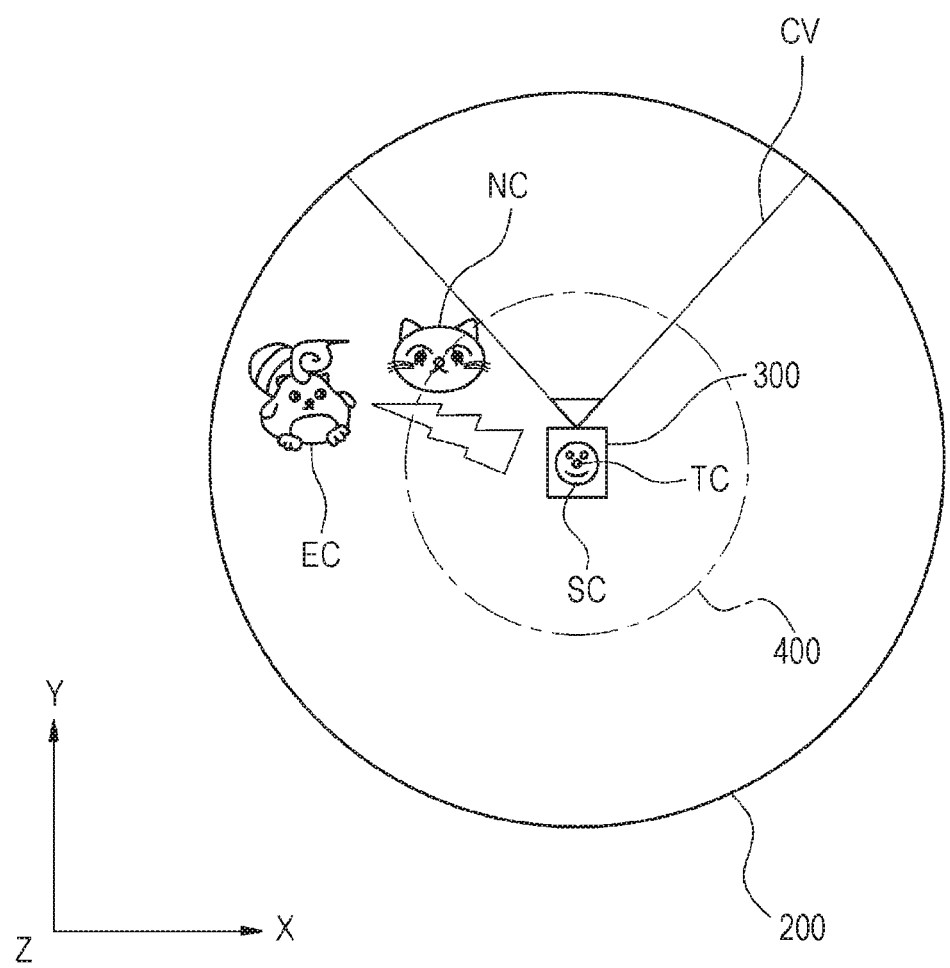
FIG. 9 is a schematic diagram of a VR space during execution of the information processing method according to at least one embodiment of this disclosure.
Figure 10:
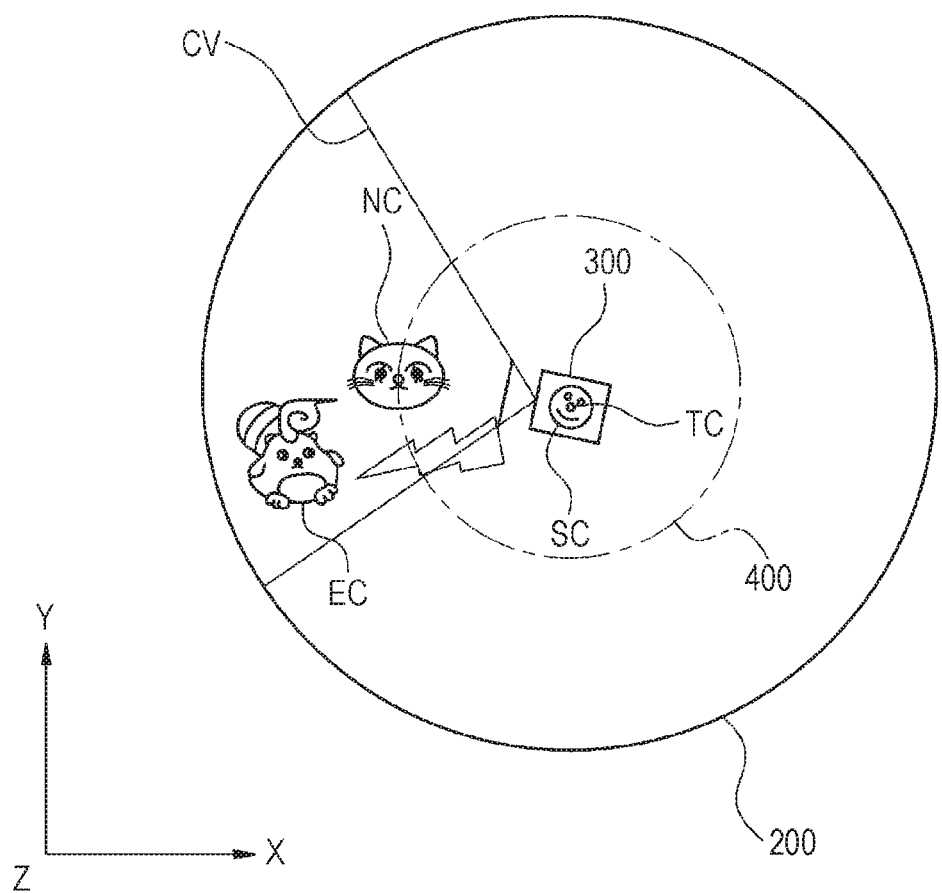
FIG. 10 is a schematic diagram of a VR space during execution of the information processing method according to at least one embodiment of this disclosure.
Figure 11:
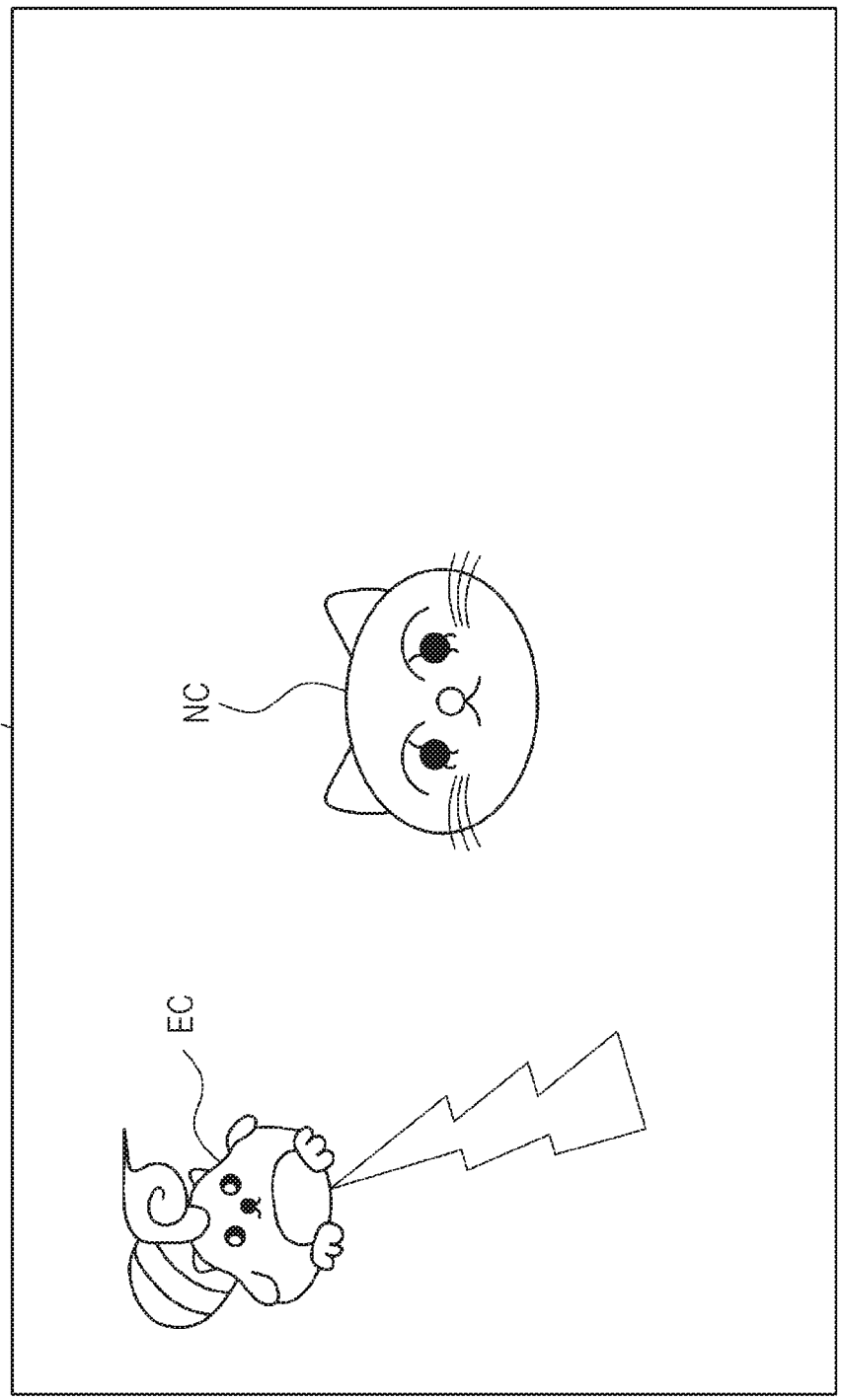
FIG. 11 is a diagram of a visual-field image relating to the information processing method according to at least one embodiment of this disclosure.
Figure 12:
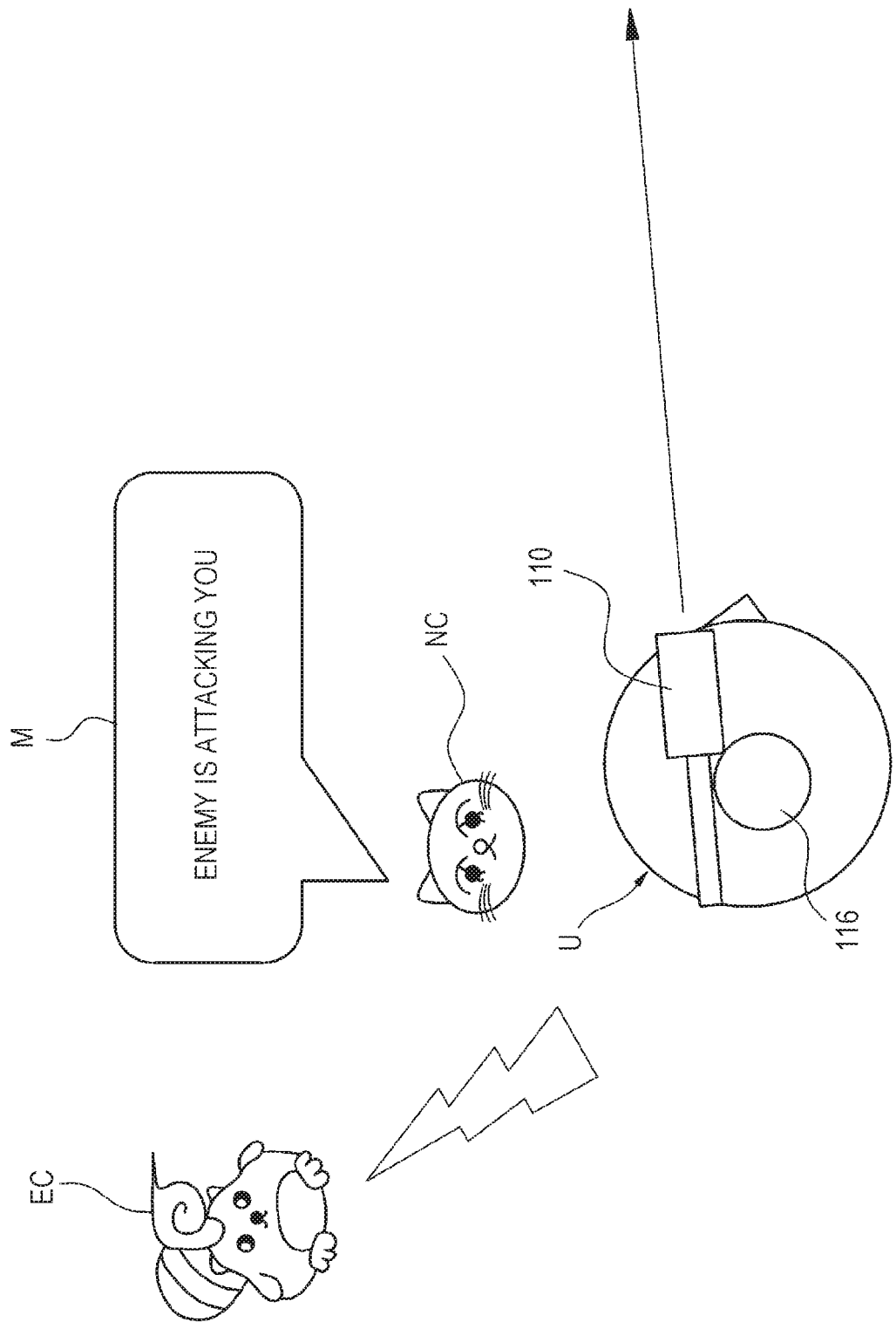
FIG. 12 is a schematic diagram of a case in which a sound message is output from a navigator object according to at least one embodiment of this disclosure.

Next, an information processing method according to at least one embodiment is described with reference to FIG. 7 to FIG. 12. FIG. 7 is a flowchart of an information processing method according to at least one embodiment of this disclosure. FIG. 8 to FIG. 10 are schematic diagrams of a VR space during execution of the information processing method according to at least one embodiment of this disclosure. FIG. 11 is a diagram of the visual-field image relating to the information processing method according to at least one embodiment of this disclosure. FIG. 12 is a schematic diagram of a case in which a sound message is output from a navigator object according to at least one embodiment of this disclosure.

First, in FIG. 8, the virtual space 200 includes the virtual camera 300, a self avatar SC (example of a third avatar object), an opponent avatar object EC (example of a first object), a navigator object NC (example of a second object), and a sound collection object TC. The control unit 121 generates the virtual space data for defining the virtual space 200 including those objects.

The virtual camera 300 is associated with the HMD system 1 operated by the user U. That is, the position and direction (i.e., visual field CV of virtual camera 300) of the virtual camera 300 are changed in accordance with the movement of the HMD 110 worn by the user U.

The self avatar SC is associated with the HMD system 1 operated by the user U. That is, the self avatar SC is an avatar object associated with the user U, and is controlled by the user U's operation of HMD system 1. In at least one embodiment, the self-avatar SC is integral with the virtual camera 300. In at least one embodiment, the virtual camera 300 is arranged at, for example, the position of the head of the self avatar SC.

The opponent avatar object EC is an avatar object capable of exerting a predetermined effect (e.g., attack or questioning) on the self avatar SC. The opponent avatar object EC is controlled by another user different from the user U in the case of a competitive game between users, or is controlled by the control device 120 (control unit 121) in the case of a competitive game of a user versus a computer.

The navigator object NC is, for example, an avatar object for supporting the user U's game progress, and is controlled by the control unit 121. The navigator object NC has a movement path 400 set so that, in principle, the navigator object NC is arranged at a fixed distance from the sound collection object TC as a center of the movement path 400. The movement path 400 may be set as, for example, a sphere having the sound collection object as a center (the movement path 400 may have a shape of a true sphere or an ellipsoid).

The sound collection object TC functions as a sound collector configured to collect a sound propagating through the virtual space 200, for example, a sound emitted by the opponent avatar object EC or the navigator object NC. The sound collection object TC is an object accompanying the virtual camera 300. The sound collection object TC is integral with the virtual camera 300, and is arranged at, for example, substantially the center position of the virtual camera 300.

Next, referring to FIG. 7, a description is given of a behavior of the navigator object NC performed in response to a determination that the self-avatar SC is likely to receive a predetermined effect from the opponent avatar object EC.

First, in FIG. 7, the control unit 121 determines whether or not the self avatar SC is likely to receive a predetermined effect, for example, an attack, from the opponent avatar object EC (Step S10). For example, in accordance with the progress of a game, when receiving a predetermined input operation performed on the opponent avatar object EC by another user or the control unit 121, the control unit 121 determines whether or not the input operation relates to an effect, for example, an attack, and determines whether or not the direction of the input operation is a direction toward the self avatar SC. When the input operation relates to an effect, for example, an attack, and the direction of the input operation is a direction toward the self avatar SC, the control unit 121 determines that the self avatar SC is likely to receive the predetermined effect from the opponent avatar object EC (Yes in Step S10). Then, the control unit 121 identifies a relative positional relationship between the sound collection object TC, which is formed integrally with the virtual camera 300, and the opponent avatar object EC (Step S12). That is, the control unit 121 identifies a specific direction in which the opponent avatar object EC is located within the virtual space 200 with respect to the sound collection object TC.

Next, the control unit 121 determines the position of the navigator object NC based on the relative positional relationship identified in Step S12 (Step S14). For example, the control unit 121 causes the navigator object NC to move from the position in FIG. 8 to the position in FIG. 9 along the movement path 400. The position of the thus moved navigator object NC is defined so that, as in FIG. 10, when the opponent avatar object EC is included in the visual field CV of the virtual camera 300, the navigator object NC is included in the same visual field CV. That is, the control unit 121 designates the position of the navigator object NC so that the opponent avatar object EC and the navigator object NC are included in the same visual-field image. In at least one embodiment, the moved navigator object NC is arranged at a position to inhibit overlapping between the moved navigator object NC and the opponent avatar object EC.

In at least one embodiment, as in FIG. 11, the control unit 121 arranges the navigator object NC at a position at which, when the opponent avatar object EC is included in the visual field CV of the virtual camera 300, the navigator object NC is included in the same visual-field image V as that of the opponent avatar object EC and the navigator object NC does not overlap with the opponent avatar object EC. In at least one embodiment, the control unit 121 identifies the position at which the navigator object NC is to be arranged so that, when the navigator object NC is arranged at a center of the visual field CV of the virtual camera 300 in a horizontal or vertical direction, the opponent avatar object EC is included in this visual-field image V. This configuration enables the user U to easily visually recognize the opponent avatar object EC when the user finds the navigator object NC at the center of the visual field CV based on the sound issued from the navigator object NC.

Next, the control unit 121 causes the navigator object NC to generate a sound message associated with the predetermined effect that is likely to be received from the opponent avatar object EC (Step S16). That is, the navigator object NC generates sound data associated with the predetermined effect caused by an action of the opponent avatar object EC. For example, as in FIG. 12, the navigator object NC generates sound data corresponding to a message M: "Enemy (opponent) avatar object EC is attacking you."

Next, the control unit 121 causes the sound collection object TC to collect the sound data generated by the navigator object NC (Step S18). Then, the sound collection object TC transmits the collected sound data to the control unit 121.

Next, the control unit 121 identifies the direction of the virtual camera 300 (Step S20). Then, based on the direction of the virtual camera 300 identified in Step S20, the control unit 121 outputs a sound (e.g., message M of FIG. 12) corresponding to the sound data acquired from the sound collection object TC from the headphones 116 of the HMD system 1 (Step S22). In response to the sound output from the headphones 116, the user U directs his or her line of sight toward the direction from which the sound is issued, that is, the virtual camera 300 is changed. As a result, the user U can recognize the existence of the opponent avatar object EC.

As described above, according to at least one embodiment, the control unit 121 determines whether or not the self avatar SC is likely to receive the predetermined effect from the opponent avatar object EC, and in response to a determination that the predetermined effect is likely to be received, identifies the relative positional relationship between the opponent avatar object EC and the sound collection object TC, and determines the position of the navigator object NC based on the identified relative positional relationship. Then, the control unit 121 causes the sound collection object TC to collect the sound data output from the navigator object NC, and causes the headphones 116 to output the sound corresponding to the sound data. With this configuration, for example, the user U can intuitively recognize the direction of the effect (attack) that is likely to be received from the opponent avatar object EC based on the direction of the sound output from the headphones 116. In this manner, according to the configuration of at least one embodiment, without harming the user U's sense of immersion, the user U is able to easily recognize that the user U is likely to receive a certain effect, for example, an attack, from the opponent avatar object EC.

Further, the control unit 121 designates the position of the navigator object NC so that the opponent avatar object EC and the navigator object NC are included in the same visual-field image V. With this configuration, when the user U directs his or her line of sight toward the navigator object NC, the opponent avatar object EC is always included in the visual-field image V. As a result, the user U can easily visually recognize the opponent avatar object EC based on the sound issued from the navigator object NC.

Further, when the opponent avatar object EC is included in the visual field CV, the control unit 121 arranges the navigator object NC at the position at which the navigator object NC does not overlap with the opponent avatar object EC in the visual-field image V. This configuration prevents the navigator object NC from impairing visibility of the opponent avatar object EC.

Further, the control unit 121 may arrange the navigator object NC at a fixed distance from the sound collection object TC as a center. With this configuration, an amount of information to be processed during the generation of a sound message is suppressed, for example. Further, appropriately implementing reproduction of 3D audio effects by adjusting, for example, sounds to be output from the left and right headphones 116 based on the positional relationship between the sound collection object TC and the navigator object NC is possible.

Further, the sound collection object TC is integral with the virtual camera 300, and hence a more realistic sound can be provided particularly in the case of a first-person viewpoint.

Figure 13:
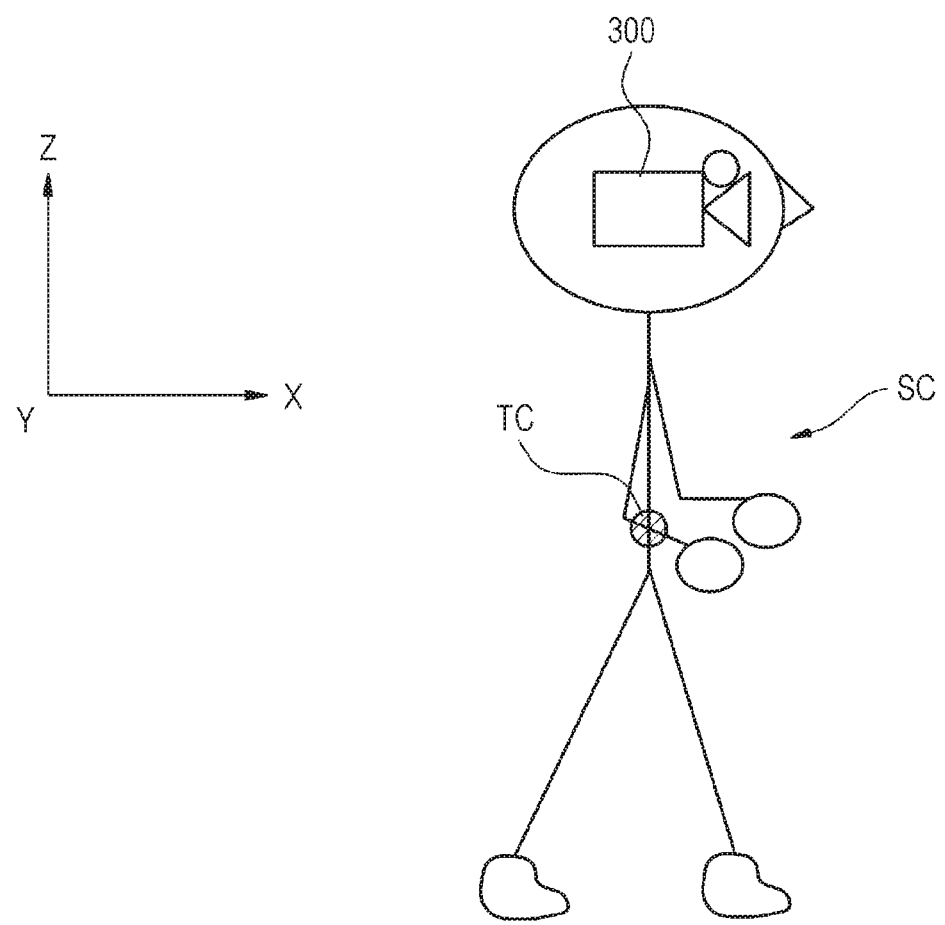
FIG. 13 is a schematic diagram of a self-avatar for use in an information processing method according to at least one embodiment of this disclosure.

In at least one embodiment described above, the sound collection object TC is integral with the virtual camera 300, but this disclosure is not limited to this example. For example, as in FIG. 13, the sound collection object TC may be integral with the self-avatar SC instead of the virtual camera 300. In this case, the navigator object NC may be arranged at a fixed position from the self avatar SC. With this configuration, for example, when the self avatar SC is likely to receive an attack from the opponent avatar object EC existing below the self avatar SC, a sound message more suited to the user U's feeling from the navigator object NC is provided, thereby allowing the user U to understand the situation more intuitively. In FIG. 13 includes the case of a first-person viewpoint, in which the virtual camera 300 is formed integrally with the head of the self-avatar SC. However, a third-person viewpoint, in which the virtual camera 300 is arranged so as to be separated from the self avatar SC, may be employed.

Further, in at least one embodiment described above, the navigator object NC is arranged at a fixed position from the sound collection object TC as a center, that is, on the movement path 400, but this disclosure is not limited to this example. The navigator object NC may be allowed to be arranged at any position around the sound collection object TC (or virtual camera 300).

This concludes descriptions of at least one embodiment of this disclosure. However, the descriptions of the at least one embodiment are not to be read as a restrictive interpretation of the technical scope of this disclosure. The at least one embodiment is merely given as an example, and is to be understood by a person skilled in the art that various modifications can be made to the embodiment within the scope of this disclosure set forth in the appended claims. Thus, the technical scope of this disclosure is to be defined based on the scope of this disclosure set forth in the appended claims and an equivalent scope thereof.

In order to implement various types of processing to be executed by the control unit 121 with use of software, an information processing program for executing the information processing method of at least one embodiment on a computer (processor) may be installed in advance into the storage unit 123 or the ROM. Alternatively, the information processing program may be stored in a computer-readable storage medium, for example, a magnetic disk (HDD or floppy disk), an optical disc (for example, CD-ROM, DVD-ROM, or Blu-ray disc), a magneto-optical disk (for example, MO), and a flash memory (for example, SD card, USB memory, or SSD). In this case, the storage medium is connected to the control device 120, and thus the program stored in the storage medium is installed into the storage unit 123. Then, the information processing program installed in the storage unit 123 is loaded onto the RAM, and the processor executes the loaded program. In this manner, the control unit 121 executes the information processing method of this embodiment.

Further, the information processing program may be downloaded from a computer on the communication network 3 via the communication interface 125. Also in this case, the downloaded program is similarly installed into the storage unit 123.

What is claimed is:

1. A method, comprising:
generating virtual space data for defining a virtual space including a self avatar, a first object capable of exerting a predetermined effect on the self-avatar, and a second object, wherein the predetermined effect is at least one of an attack or a questioning;
detecting movement of a head-mounted display;
identifying a visual field based on the detected movement of the head-mounted display;
generating a visual-field image representing the visual field in the virtual space;
displaying the visual-field image on the head-mount display;
identifying a relative positional relationship between the first object and the self-avatar in response to a determination that the self-avatar is likely to receive the predetermined effect from the first object, wherein the relative positional relationship is identified based on coordinates of the self-avatar and the first object in the virtual space;
moving the second object from a first position in the virtual space to a second position in the virtual space based on the identified relative positional relationship;
outputting predetermined sound data based on the set position of the second object; and
outputting a sound corresponding to the predetermined sound data from a sound outputting unit.

2. The method according to claim 1, wherein the moving of the second object comprises setting the position so that the first object and the second object are included in a same visual field.

3. The method according to claim 1, wherein the moving of the second object comprises setting the position so that when at least a part of the first object is included in the visual field, the second object is also included in the visual field.

4. The method according to claim 3, wherein the moving of the second object comprises setting the second object at the position that is inhibited from overlapping with the first object.

5. The method according to claim 3, wherein the moving of the second object comprising setting the position of the second object at a center of the visual field, and the first object is included in the visual field.

6. The method according to claim 1, wherein the outputting of the sound from the sound outputting unit comprises outputting the sound in a manner that corresponds to the relative positional relationship between the self avatar and the second object.

7. An system, comprising:
a processor; and
a non-transitory memory connected to the processor, wherein the non-transitory memory is configured to store a computer-readable instruction,
the processor being configured to execute the computer-readable instruction for:
generating virtual space data for defining a virtual space including a self-avatar, a first object capable of exerting a predetermined effect on the self-avatar, and a second object, wherein the predetermined effect is at least one of an attack or a questioning;
detecting movement of a head-mounted display;
identifying a visual field based on the detected movement of the head-mounted display;
generating a visual-field image representing the visual field in the virtual space;
instructing the head-mount display to display the visual-field image;
identifying a relative positional relationship between the first object and the self-avatar in response to a determination that the self-avatar is likely to receive the predetermined effect from the first object, wherein the relative positional relationship is identified based on coordinates of the self-avatar and the first object in the virtual space;
moving the second object from a first position in the virtual space to a second position in the virtual space based on the identified relative positional relationship;
outputting predetermined sound data based on the set position of the second object; and
instructing a sound outputting unit to output a sound corresponding to the predetermined sound data.

8. The system according to claim 7, wherein the processor is further configured to move the second object by setting the position so that the first object and the second object are included in a same visual field.

9. The system according to claim 7, wherein the processor is further configured to move the second object by setting the position so that when at least a part of the first object is included in the visual field, the second object is also included in the visual field.

10. The system according to claim 9, wherein the processor is further configured to move the second object by setting the second object at the position that is inhibited from overlapping with the first object.

11. The system according to claim 9, wherein the processor is further configured to move the second object by setting the position of the second object at a center of the visual field, and the first object is included in the visual field.

12. The system according to claim 7, wherein the processor is further configured to output the predetermined sound data based on the relative positional relationship between the self-avatar and the second object.

13. An system, comprising:
a head-mount display;
a sound outputting unit in communication with the head-mount display;
a processor in communication with the head-mount display; and
a non-transitory memory connected to the processor, wherein the non-transitory memory is configured to store a computer-readable instruction,
the processor being configured to execute the computer-readable instruction for:
generating virtual space data for defining a virtual space including a self-avatar, a first object capable of exerting a predetermined effect on the self-avatar, and a second object, wherein the predetermined effect is at least one of an attack or a questioning;
detecting movement of the head-mounted display;
identifying a visual field based on the detected movement of the head-mounted display;
generating a visual-field image representing the visual field in the virtual space;
instructing the head-mount display to display the visual-field image;
identifying a relative positional relationship between the first object and the self-avatar in response to a determination that the self-avatar is likely to receive the predetermined effect from the first object, wherein the relative positional relationship is identified based on coordinates of the self-avatar and the first object in the virtual space;
moving the second object from a first position in the virtual space to a second position in the virtual space based on the identified relative positional relationship;
outputting predetermined sound data based on the set position of the second object; and
instructing the sound outputting unit to output a sound corresponding to the predetermined sound data.

14. The system according to claim 13, wherein the processor is further configured to move the second object by setting the position so that the first object and the second object are included in a same visual field.

15. The system according to claim 13, wherein the processor is further configured to move the second object by setting the position so that when at least a part of the first object is included in the visual field, the second object is also included in the visual field.

16. The system according to claim 15, wherein the processor is further configured to move the second object by setting the second object at the position that is inhibited from overlapping with the first object.

17. The system according to claim 15, wherein the processor is further configured to move the second object by setting the position of the second object at a center of the visual field, and the first object is included in the visual field.

18. The system according to claim 13, wherein the processor is further configured to output the predetermined sound data based on the relative positional relationship between the self-avatar and the second object.

19. The system according to claim 13, wherein the sound outputting unit comprises headphones including a plurality of speakers.

20. The system according to claim 19, wherein, based on the predetermined sound data, the processor is further configured to instruct the headphones to:
output a first sound from a first speaker of the plurality of speakers, and
output a second sound from a second speaker of the plurality of speakers, wherein the first sound is different from the second sound.

* * * * *